United States Patent [19]

Bi

[11] Patent Number: 5,623,485
[45] Date of Patent: Apr. 22, 1997

[54] DUAL MODE CODE DIVISION MULTIPLE ACCESS COMMUNICATION SYSTEM AND METHOD

[75] Inventor: Qi Bi, Morris Plains, N.J.

[73] Assignee: Lucent Technologies Inc., Murray Hill, N.J.

[21] Appl. No.: 392,014

[22] Filed: Feb. 21, 1995

[51] Int. Cl.$^6$ .......................... H04B 7/216; H04J 13/02
[52] U.S. Cl. ......................... 370/209; 370/342; 375/206; 375/207; 375/208; 375/367
[58] Field of Search ................. 370/18, 19, 20, 370/21, 22, 98, 100.1, 107, 110.1; 375/200, 205, 206, 207, 208, 308, 324, 325, 340, 343, 365, 367; 379/58, 59, 63; 455/33.1, 34.1, 53.1, 54.1, 63, 67.4, 68

[56] References Cited

U.S. PATENT DOCUMENTS

| | | | |
|---|---|---|---|
| 4,901,307 | 2/1990 | Gilhousen et al. | 370/18 |
| 5,103,459 | 4/1992 | Gilhousen et al. | 375/205 |
| 5,109,390 | 4/1992 | Gilhousen et al. | 375/205 |
| 5,136,612 | 8/1992 | Bi | 370/18 |
| 5,175,743 | 12/1992 | Crespo et al. | 370/18 |
| 5,175,744 | 12/1992 | Crespo et al. | 370/19 |
| 5,177,768 | 1/1993 | Crespo et al. | 370/19 |
| 5,309,474 | 5/1994 | Gilhousen et al. | 370/18 |
| 5,329,547 | 7/1994 | Ling | 375/206 |

OTHER PUBLICATIONS

"Mobile Station–Base Station Compatibility Standard for Dual–Mode Wideband Spread Spectrum Cellular System", Telecommunication Industry Association, Doc. No. TIA/EIA/IS–95 (1993).

Primary Examiner—Alpus H. Hsu

[57] ABSTRACT

A CDMA communication system capable of operating at higher data rates with less bit errors and reduced cochannel interference facilitates coherent detection without the use of a pilot tracking signal. A transmitter in the communication system includes a coherence interval channel encoder, an orthogonal function encoder, such as a Walsh encoder, as well as a pseudo noise (PN) channel modulator. The channel encoder processes data sequences into sufficiently short encoded data blocks to minimize any phase shifts at a receiver in a high mobility environment due to a Doppler frequency shift. Depending on the application, several transmitters may be synchronized such that the corresponding transmitted information signals are orthogonal to one another. A receiver of the communication system includes a channel demodulator, matched filters and coherent decoder that generates weighted decoded signals, one of which is determined to be a proper coherent synchronous reading of the received information signals without the use of a pilot tracking signal. The communication system may be used as a forward and/or reverse communications link in a cellular telephone system.

48 Claims, 8 Drawing Sheets

DUAL MODE CODE DIVISION MULTIPLE ACCESS COMMUNICATION SYSTEM AND METHOD

FIELD OF THE INVENTION

This invention relates to cellular and wireless radio communication systems, and in particular to communication systems utilizing code division multiple access (CDMA) in a direct sequence spread spectrum system (DSSS) that can operate in a synchronous or nonsynchronous mode.

BACKGROUND OF THE INVENTION

CDMA modulation techniques have been employed in communication systems to permit a large number of system users to communicate with one another. In a CDMA communication system, all communication channels are broadcast at a common broadband frequency. Each channel is differentiated by a unique spreading code. Prior to transmission, each information signal is modulated with a spreading code to convert the information signal into a broadband signal. A receiver demodulates the received broadband signal by combining the broadband signal with the corresponding spreading code to recover the information signal. The spreading code is typically a binary code. Since the same wide bandwidth is available to all users, information signals in other channels may appear as cochannel interference or noise when the received signal is demodulated by the spreading code.

A widely used CDMA communication system is disclosed in U.S. Pat. No. 4,901,307 ('307 patent), which is incorporated by reference herein. In this system, each information signal is modulated by a pseudo-random noise (PN) sequence before it is modulated for radio transmission. The modulation with the PN sequence can be regarded as a spreading process because it produces a very wide bandwidth compared with the original information signal. A communication system specified in standard IS-95 adopted by the Telecommunication Industry Association (TIA) is substantially similar to the communications system of the '307 patent. A more detailed description of the IS-95 communication system standard is provided in "Mobile Station-Base Station Compatibility Standard for Dual-Mode Wideband Spread Spectrum Cellular System", Telecommunication Industry Association, Doc. No. TIA/EIA/IS-95 (1993), which is incorporated by reference herein.

In a forward communications link, from a base station or cell site to a mobile receiver unit the communication system of the '307 patent and the IS-95 standard substantially eliminate cochannel interference and improve bit energy to the noise density ratio $E_b/N_o$ by modulating the information signals with Walsh orthogonal function sequences. To produce corresponding orthogonal information signals, these CDMA systems require that the forward link information signals be transmitted in a synchronized manner. A further improvement in the bit energy to noise density ratio $E_b/N_o$ is achieved in the forward links of these systems by the use of coherent signal detection in the mobile unit receivers that is based on a pilot tracking signal transmitted by the cell-site.

However, in a reverse communications link of these systems, mobile units transmit data to a cell site using a different communication technique. The mobile units employ Walsh sequences in an M-ary signaling scheme with no synchronization when transmitting data signals. As a consequence, broadband signals transmitted in the reverse link are not orthogonal to one another and experience greater cochannel interference which results in a significant loss in the bit energy to noise density ratio $E_b/N_O$ of the signal received by the cell-site. Further, since the mobile units do not transmit a pilot tracking signal the corresponding cell-site does not employ coherent detection resulting in a further loss in the bit energy to noise density ratio $E_b/N_O$. As a consequence, the maximum data transmission rate and corresponding bit error rate of the communication systems are limited by this reverse link communication technique.

A recognized need exists for a CDMA system that can achieve greater data transmission rates with the capability of reduced bit error rates. Such a system should employ coherent signal detection in the forward and reverse communications links and also enable information signals in the reverse link to be transmitted in a synchronous or nonsynchronous manner depending upon the mobile unit environment.

SUMMARY OF THE INVENTION

The present invention is directed to transmitters and receivers in a dual mode CDMA communication system to facilitate coherent detection of transmitted spread spectrum data signals without the use of a pilot tracking signal. The transmitters transmit modulated spread spectrum data signals that include encoded data blocks of sufficiently short length to minimize phase shift of the data signals at the receiver due to the Doppler shift frequency. The transmitters may operate in synchronous or nonsynchronous transmission modes to take advantage of synchronous transmission gains where possible.

An exemplary transmitter in accordance with the present invention includes a coherence interval channel encoder to process an input data signal into encoded data blocks; an orthogonal function encoder to combine the encoded data blocks with an orthogonal function sequence to form a spread data signal; and a pseudo-noise (PN) channel modulator to combine the spread signal with at least one PN sequence and to modulate the resulting data signal. The channel encoder generating sufficiently small encoded data blocks to minimize phase shift of the transmitted data signal at the receiver to enable the receiver to perform coherent detection of the data signal. For example, the encoded data block length should be such that when the encoded data block is transmitted at the system transmission rate the encoded data block is transmitted over an interval that is 10% of the smallest expected Doppler phase shift interval at the receiver.

An exemplary receiver in accordance with the present invention includes a channel demodulator, such as a quadrature phase shift keying (QPSK) or a biphase shift keying (BPSK) channel demodulator, for demodulating a received data signal; first and second matched filters with associated PN and orthogonal function sequence generators to process the demodulated signal into in-phase and quadrature phase processed signals; first and second A/D converters to convert the processed signals to digital signals; and a weighted signal coherent decoder to generate weighted decoded signals and select the generated decoded signal that represents a synchronous in-phase reading of the received data signal.

An exemplary coherent decoder in accordance with the present invention includes power estimators for generating signals representing the root-mean-square power of the in-phase and quadrature phase digital signals and complement power signals; a weighted signal generator for generating weight signals by combining the digital signals with the respective power and power complement signals; channel decoders to decode each of the weighted signals; and a decoded signal selection circuit to identify which of the decoded weighted signals represents an in-phase reading of the received data signal. A suitable selection circuit re-encodes each of the decoded signals and multiples each of the re-encoded signals with the corresponding originally encoded signals. The resulting product signals are then integrated. The generated integrated signal with the greatest magnitude is used to identify the corresponding decoded signal as a synchronous in-phase reading of the data signal.

Additional features and advantages of the present invention will become apparent by reference to the following detailed description and accompanying drawings.

DETAILED DESCRIPTION

Figure 1:
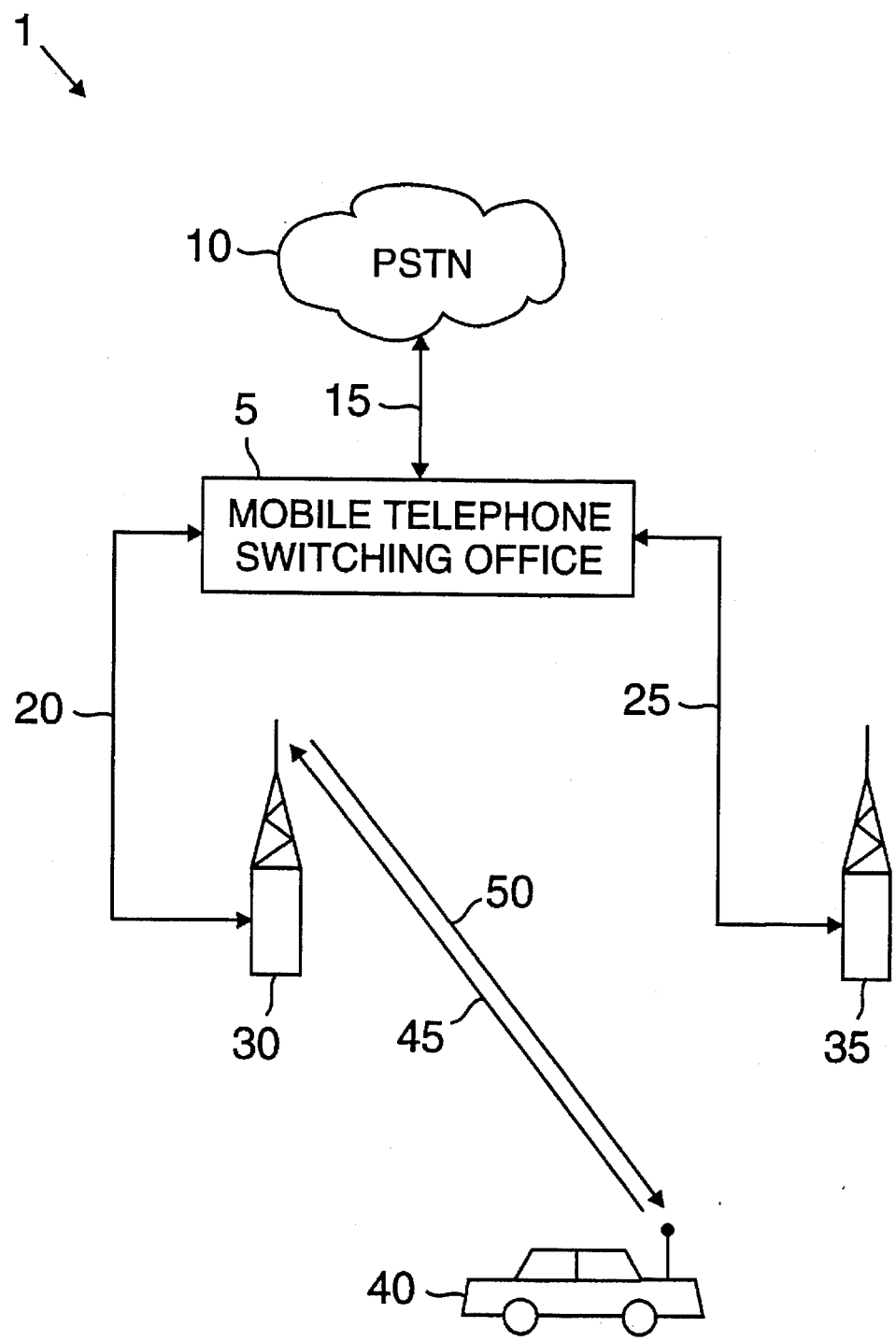
FIG. 1 is a block diagram of a cellular telephone system employing a dual mode CDMA communication system in accordance with the present invention.

An exemplary cellular telephone system 1 employing a dual-mode CDMA communication system according to the present invention is illustrated in FIG. 1. A mobile telephone switching office 5 is coupled to a land public switched telephone network 10 by a trunk line 15. The mobile telephone switching office 5 is also connected by trunk lines 20 and 25 to respective cell-sites 30 and 35. Each of the cell-sites 30 and 35 have radio transmitters and receivers with antennas that employ radio signals to communicate with mobile telephone units, such as the mobile telephone unit 40. While a single unit 40 is shown, it will be appreciated that many such telephone units will typically be included in a system. Similarly, the number of other components shown in FIG. 1 may also vary from the number shown for purposes of illustration.

The mobile telephone unit 40 communicates with a single corresponding cell-site as determined by the best quality signal propagation between cell-site and mobile telephone based on signal propagation rules and criteria within the cellular-telephone system 1. Such signal propagation rules and criteria are well known in the art. In FIG. 1, the mobile telephone unit 40 is illustrated communicating with the cell-site 30. Communication from the cell-site 30 to the mobile telephone unit 40 occurs over a radio transmission link referred to as a forward link and is represented by an arrow 50. Communication from the mobile telephone unit 40 to the cell-site 30 occurs over a separate radio transmission link referred to as a reverse link and is represented by an arrow 45. Typically, there is only one forward link and one reverse link between a mobile telephone unit and a cell-site.

Telephone calls between the mobile telephone unit 40 and another user, such as a land-based wired telephone or another mobil telephone unit, occur over the respective links 45 and 50 between the mobile telephone unit 40 and cell-site 30 and over the trunk lines 20 and 15 between the cell-site 30 and mobile telephone switching office 5 and public switched telephone network 10, respectively.

Figure 2:
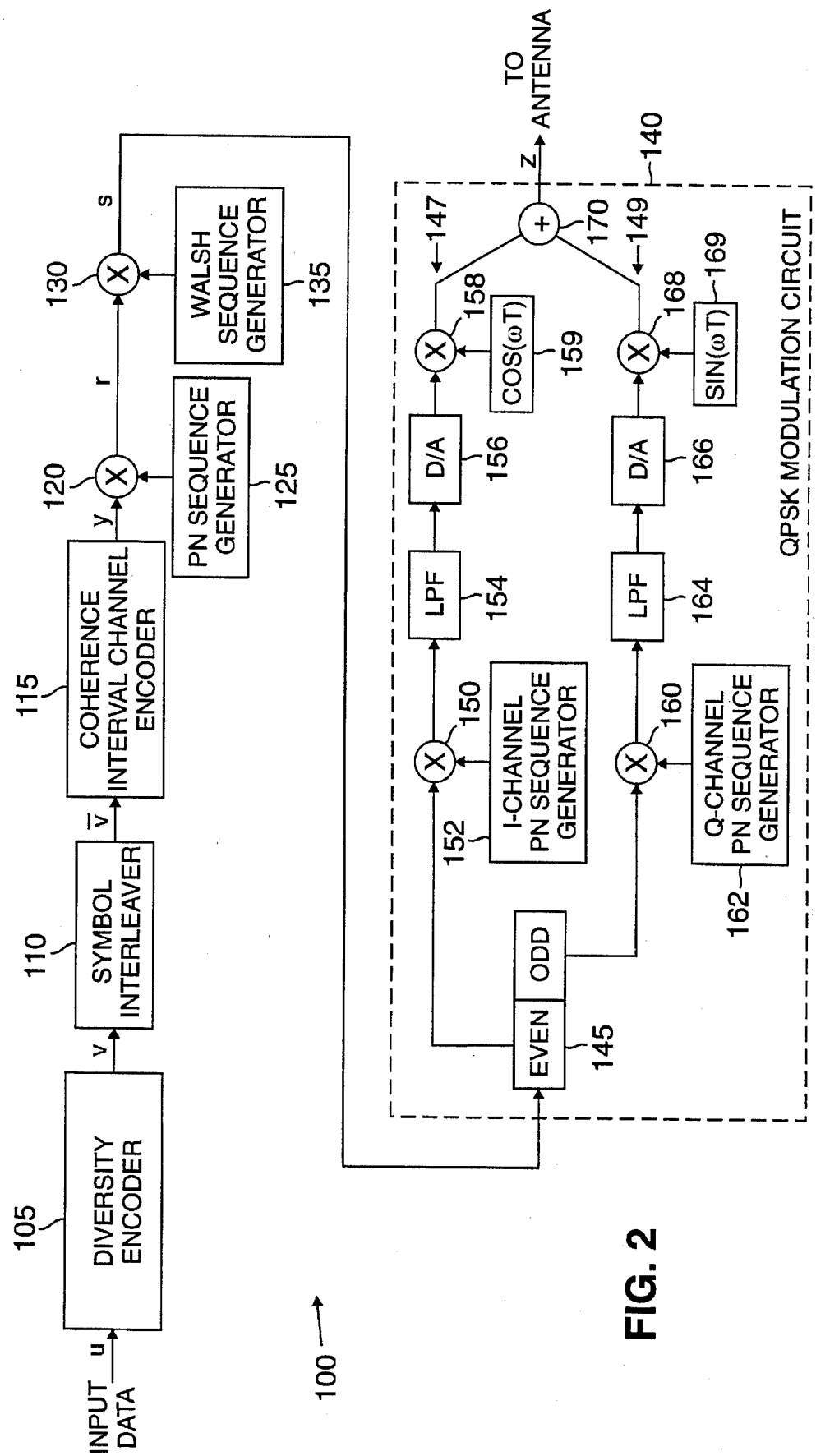
FIG. 2 is a schematic block diagram of an exemplary dual mode transmitter according to the present invention which may be used in a cell-site or mobile unit of the communication system in FIG. 1.
Figure 3:
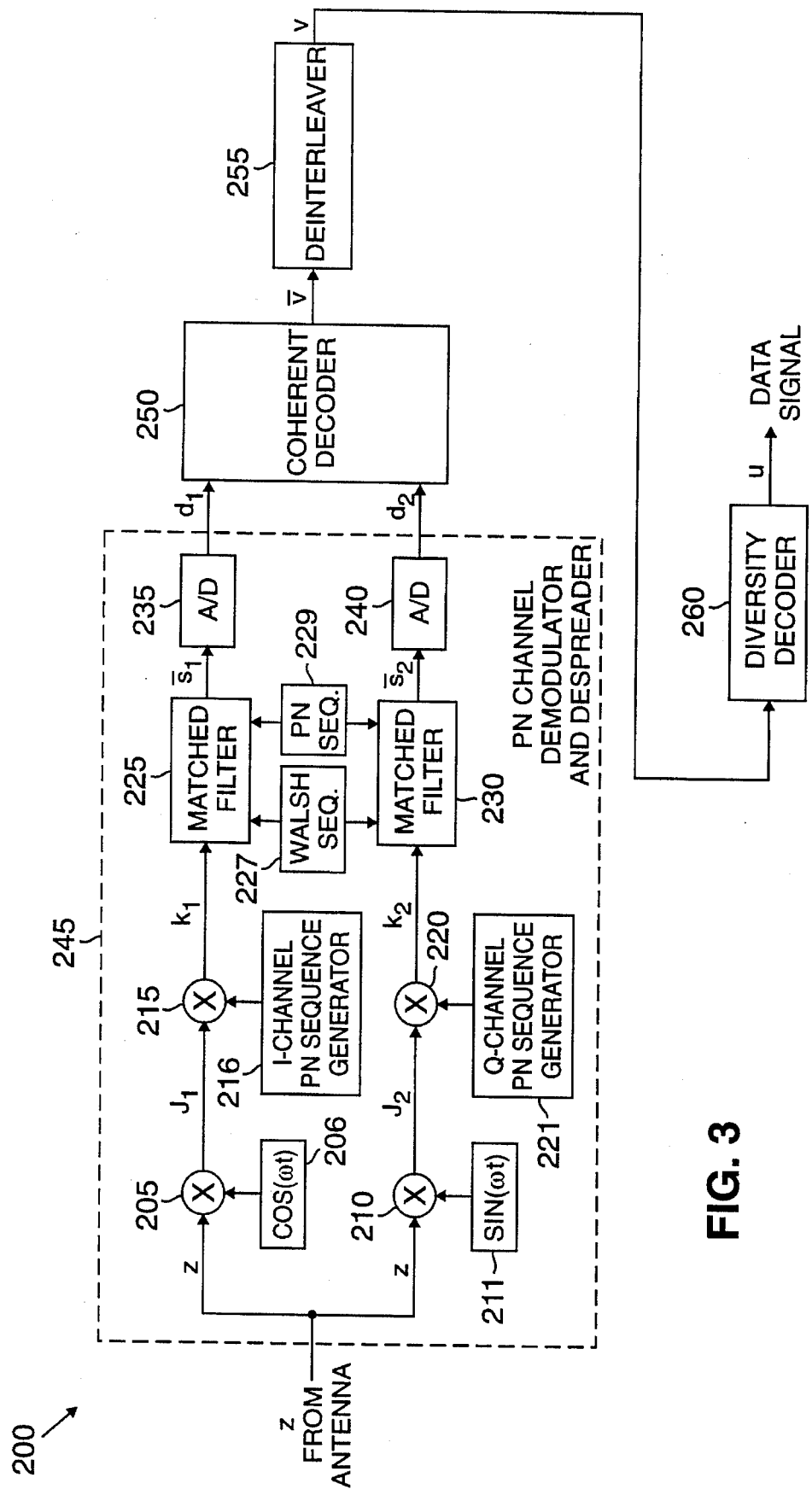
FIG. 3 is a schematic block diagram of an exemplary receiver according the present invention which may be used in a cell-site or mobile unit of FIG. 1.
Figure 8:
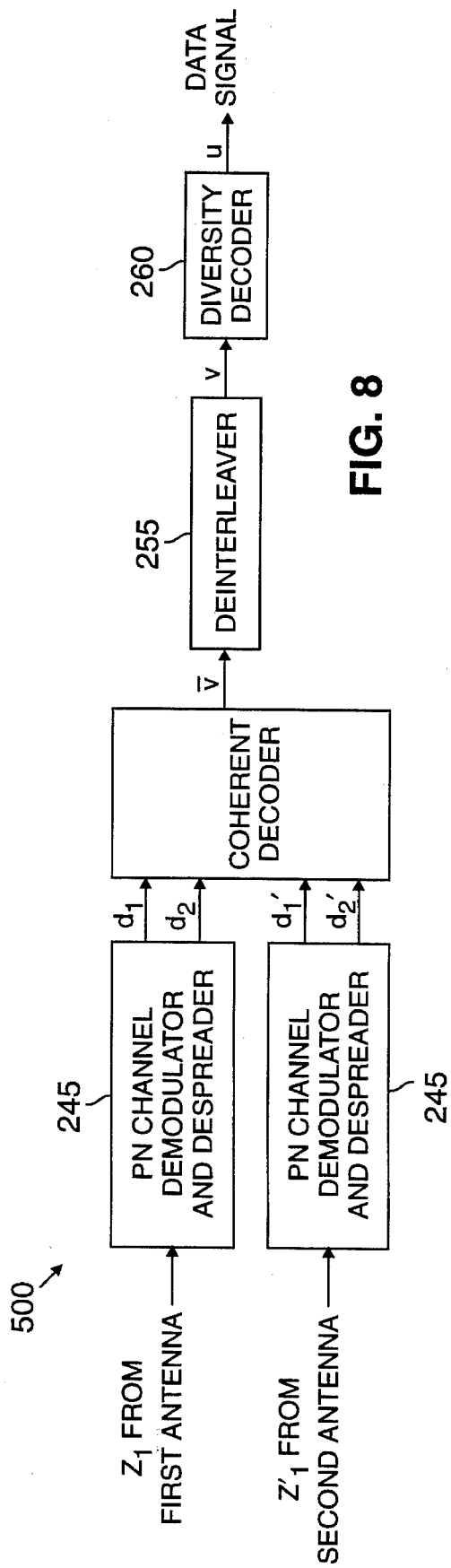
FIG. 8 is a schematic block diagram of an alternative embodiment of a receiver according to the present invention that is capable of processing signals from multiple antennas.

Schematic diagrams of a transmitter and receivers according to the present invention which may be used in the cell-site 30 and/or mobile telephone unit 40 are shown in FIGS. 2, 3 and 8, and are described in greater detail below. The telephone system 1 uses CDMA spread spectrum modulation techniques to provide communication between the mobile telephone unit and the cell-sites. A cellular system for use in large cities may have hundreds of cell-sites serving hundreds of thousands of mobile telephone units. The use of CDMA spread spectrum techniques according to the present invention enables increases in user capacity and data transmission rates as compared to known CDMA communications systems.

An exemplary transmitter 100 according to the present invention that is capable of generating a modulated spread spectrum signal z based on an input data stream u, such as digitized speech signal, is shown in FIG. 2. In FIG. 2, the input data stream u, is provided to a diversity encoder 105. The diversity encoder 105, encodes the bits of the data stream u at a particular encoding rate A to generate an encoded data signal v. The encoded data of the data signal v may be arranged into data symbols. The diversity encoder 105 provides the encoded data signal v to a symbol interleaver 110 which interleaves or reorders the symbols contained in the data signal v to form an encoded and interleaved data signal $\bar{v}$.

The diversity encoder 105 and symbol interleaver 110 are presently preferred optional components that can operate with the present invention but are not required or essential in practicing the data transmission techniques of the present invention. The diversity encoder 105 may preferably be a Reed-Solomon encoder having an encoding rate of A=¾ in a Galois field $GF(2^7)$ with every five data bits of the data stream u being encoded into a seven bit RS symbol of the encoded signal v. Accordingly, the RS symbols within the generated signal v are repetitively interleaved by the symbol interleaver 110 over a time interval that is agreed upon at the call setup between the transmitter and corresponding receiving units. Using a Reed Solomon encoder as the diversity encoder 105 provides sufficient redundancy to achieve noise protection and diversity gain in conjunction with the present invention. Further, the interleaving of data symbols provided by the interleaver 110 reduces the effects of burst errors to provide yet additional diversity gain.

The symbol $\bar{v}$ interleaver 110 provides the encoded and interleaved data signal $\bar{v}$ to a coherence interval channel encoder 115 that encodes the signal $\bar{v}$ into encoded data blocks of a particular length to generate a signal y. In accordance with the present invention, the length of the encoded data blocks should be sufficiently short that when transmitted at the system's data rate, a minimal phase shift of the transmitted signal z due to a Doppler phase shift occurs at the receiver.

Any phase shift occurring during reception of an encoded data block should be sufficiently small to enable the receiver to perform coherent signal detection. Coherent detection of a data signal is a synchronous in-phase reading of the data signal. Further, any phase shift during the reception of a data block should be sufficiently small to permit coherent detection independent of whether the communication system is in a low or high mobility environment. A high mobility environment is one in which the mobile unit of the communication system is traveling at speeds typically achieved by automobiles, trains and airplanes. Since the mobile unit is in motion the phase of the modulated signals it transmits and receives will shift over time at the respective receivers.

The frequency at which a data signal will shift over a fixed period of time due to the motion of the mobile unit is commonly referred to as the Doppler shift frequency. For instance, if the Doppler shift frequency is 200 Hz then the phase will shift 360° every 5 msec., or 1/200 Hz, which is referred to as the Doppler shift interval. The Doppler shift frequency is dependent on the speed of the mobile unit. For example, the Doppler shift frequency is approximately 150 Hz when the mobile unit is traveling at 100 kilometers per hour (62.5 MPH).

According to the present invention, the transmission period of each encoded data block should be much smaller than the Doppler shift interval to minimize any phase shift that may occur during reception of the data signal at the receiver. The period of the encoded blocks should be approximately 10% of the corresponding smallest expected Doppler shift interval or less. The corresponding minimal phase shift in the data signal z at a receiver enables the receiver to perform coherent detection without the requirement of a pilot tracking signal as used in the CDMA system of U.S. Pat. No. 4,901,307. Receivers capable of performing coherent detection in accordance with the present invention are described below with respect to FIGS. 3 and 8.

A suitable coherence interval channel encoder 115 that generates sufficiently short encoded blocks is a convolutional encoder having an encoding rate of approximately $B=\frac{1}{3}$ and that encodes the seven bit symbols of the interleaved signal $\bar{v}$ into 20 bit blocks in the data signal y. Such an encoder may employ a one-half rate convolutional encoder with six trailing bits. The resulting encoding rate is $\frac{7}{20}$ or approximately $\frac{1}{3}$. If data is transmitted at a rate of 64 Kbs, then the encoded 20 bit blocks of the signal $\bar{v}$, which represents five bits of the input data signal u, would be transmitted in the signal z over a time interval of 0.08 msec. Since each encoded block is transmitted over 0.08 msec., then minimal phase shift of the signal z will occur at the receiver, even in a high mobility environment having a Doppler shift interval of approximately 5 msec. In such a high mobility environment, the resulting phase shift expected at the receiver would be approximately 6° ((0.08 msec./5 msec.)×360°) during the reception of each encoded block. Such a minimal phase shift in the received data signal enables the receiver to perform coherent detection without need of a pilot tracking signal or complex phase estimation circuitry.

Although the TIA specifies the use of a convolutional encoder in the IS-95 standard described above, such an encoder processes data blocks of 192 bits with a transmission data rate of 9.6 Kbs resulting in block intervals of 20 msec. In a high mobility environment having a Doppler shift interval of about 5 msec., a 360° phase shift will occur four times over the duration of each transmitted block of the data signal. Accordingly, coherent detection of the corresponding transmitted data signal would be very difficult.

Another advantage of the coherence interval channel encoder 115 is that the generated short encoded data blocks can be detected at the receiver a sequence at a time. Such detection results in less bit errors to produce an overall coherent combining gain in the communication system. In contrast, the IS-95 standard uses the 192 bit long encoded blocks which necessitates the use of a less advantageous bit-at-a-time detection.

The encoded signal y produced by the coherence interval channel encoder 115 is provided to a first signal multiplier 120. A pseudo-noise (PN) sequence generator 125 is also connected to the signal multiplier 120. The signal multiplier 120 and PN sequence generator 125 operate as a PN encoder because the signal multiplier 120 combines the signal y with a PN sequence generated by the PN sequence generator 125 to form a scrambled signal r. The particular PN sequence provided by the PN sequence generator 125 should correspond to the particular intended destination receiver.

The combining of the data signal y with the PN sequence by the signal multiplier 120 provides a measure of security from eavesdropping. The resulting spread spectrum signal z would appear as noise to any receiver that did not descramble the signal using the particular PN sequence code. The security from eavesdropping provided by the signal combiner 120 and the PN sequence generator 125 is a presently preferred added feature and is not essential to the operation of a transmitter in accordance with the present invention. Thus, the signal combiner 120 and PN sequence generator 125 may be omitted from the transmitter 100 of FIG. 2 without affecting the performance of the communication system 1 in an implementation where communication privacy is not critical.

The scrambled signal r produced by the multiplier 120 is provided to a second signal multiplier 130 that also receives orthogonal function sequences from an orthogonal function generator, such as a Walsh sequence generator 135. The signal multiplier 130 and Walsh sequence generator 135 operate as an orthogonal function encoder because the signal multiplier 130 combines the scrambled signal r with one of N Walsh sequences to form a signal s having a spread spectrum. The signal s is referred to as a spread signal.

Combining the signal r with a Walsh sequence spreads the data signal over the spectrum of the bandwidth of the particular communication link. The particular Walsh sequence may be assigned at the initiation of the telephone call and may be used for the duration of the call. A Walsh sequence contains values which correspond to a row of a Walsh function matrix which is also known as a Hardamard matrix. A Walsh sequence of length N may be obtained from a corresponding matrix of order N. A more detailed description of Walsh sequences and matrices is found in K.G. Beauchamp, Applications of Walsh and Related Functions with an Introduction to Sequence Theory, (Academic Press, 1984), which is incorporated by reference herein.

A Walsh function matrix of order N has the property that over the interval of N code symbols, the cross-correlation between all the different sequences within the set is zero. In a Walsh matrix, every sequence differs from every other sequence in exactly one-half of its bits. In order for the corresponding spread spectrum signal z to be likewise orthogonal with other spread spectrum signals, the signals must be transmitted in a synchronized or time aligned manner.

The second signal multiplier 130 provides the spread signal s to a PN channel modulator such as a PN quadrature phase shift keying (QPSK) modulator 140. The PN QPSK modulator 140 permits two information bits in the spread signal s to be transmitted simultaneously in a time interval normally allotted for a single information bit. QPSK modulators are well known in the art. The components of a suitable QPSK modulator are illustrated within the block outline of the modulator 140 and are not meant to be a limitation on the present invention.

Within the QPSK modulator 140, a multiplexer 145 directs the even and odd bits received in the spread signal s to in-phase or I-channel components 147 and quadrature or Q-channel components 149, respectively. The I-channel components 147 include a signal multiplier 150 connected to an I-channel PN sequence generator 152 and a low pass filter 154, which may preferably be a finite impulse response (FIR) filter. The filter 156 is further connected to a digital-to-analog (D/A) converter 150 which is connected to a signal multiplier 158. The signal multiplier 158 is also connected to an in-phase frequency generator 159 and a signal adder 170.

The Q-channel components 149 are substantially identical to the I-channel components 147, except that they provides a Q-channel PN encoded data signal to the signal adder 170. The Q-channel components 149 include a signal multiplier 160 that receives the odd ordered data bits from the multiplexer 145 and a particular PN sequence from a Q-channel PN sequence generator 162. The signal multiplier 160 multiplies these sequences and is connected to a low pass filter 164. The filter 164 is also connected to a D/A converter 166 that is connected to a signal multiplier 168. The signal multiplier 168 is further connected to a quadrature-phase frequency generator 169 and to the signal adder 170. The signal adder 170 combines in-phase and quadrature data signals received from the respective channel components 147 and 149 to form the modulated spread spectrum signal z which is provided to an antenna for transmission. An RF amplifier may be used to amplify the signal z prior to transmission by the antenna in a manner well known in the art.

In operation, the multiplexer 145 of the PN QPSK modulator 140 splits the even and odd ordered bits of the spread signal s for processing by the I- and Q-channel components 147 and 149, respectively. The split signals are then further scrambled and spread by the respective signal multipliers 150 and 160 and associated PN sequence generators 152 and 162. The split scrambled signals are then provided to the corresponding filters 154 and 164 which perform pulse shaping for band limiting the resulting I- and Q-channel spread signals. The filtered split signals are then provided to the respective D/A converters 156 and 166 for conversion to analog signals.

The generated analog signals are then modulated by the signal multipliers 159 and 169 with corresponding quadrature carrier signals $\cos(\omega t)$ and $\sin(\omega t)$ that possess the same frequency but differ in phase by 90°. The resulting modulated I- and Q-channel signals are then summed by the signal adder 170. Since the quadrature carrier signals $\cos(\omega t)$ and $\sin(\omega t)$ are shifted 90° from one another, the resulting modulated I- and Q-channel signals are shifted 90° from one another such that when combined by the adder 170 to form the modulated spread spectrum signal z the signals are orthogonal with one another.

Although a transmitter according to the present invention is depicted with a PN QPSK modulator as the PN channel modulator in FIG. 2, any PN channel modulator may be used including, for example, a bi-phase shift keying (BPSK) modulator. A suitable BPSK modulator is essentially similar to the QPSK modulator shown in FIG. 2 but omits the multiplexer 145. In such a BPSK modulator, each bit of the spread signal s is directly provided to both the signal multipliers 150 and 160 where it is combined with respective I-and Q-channel PN sequences from the PN sequence generators 152 and 162 before modulation.

The transmitter 100 can be employed in the cell-site 30 of FIG. 1 for the forward communications link 45. A plurality of transmitters 100 may preferably be used in the cell-site 30 to facilitate communication with up to a like plurality of mobile units. Each one of such transmitters maintains communication over a corresponding forward communication link to a respective mobile unit. In such a communication system, different Walsh sequences are used by the Walsh sequence generators 135 of each transmitter and the corresponding generated spread signals are synchronized or time aligned to produce orthogonal signals which do not cause interference with one another.

Likewise, the transmitter 100 can be employed in the mobile unit 40 for transmitting data over the reverse communications link 50 of FIG. 1. In particular applications, it is desirable and feasible to synchronize the generated combined spread signals of transmitters within mobile units. For example, multiple computers in a building or micro-cells or other indoor transmitters that communicate with a particular cell-site may communicate with one another or with a communications controller (not shown) to synchronize their transmitted spread spectrum signals. The transmitters of such mobile units would operate in a substantially identical manner as that described above with respect to the cell-site transmitters.

Conversely, synchronization of data signals in the reverse link of communications systems, such as those described in U.S. Pat. No. 4,903,307, which merely employs an M-ary signaling scheme, would be very difficult and costly to implement. Thus, when synchronized, signals transmitted in the reverse link by a transmitter according to the present invention have substantially reduced interference compared with these types of prior art CDMA systems. Further, if the reverse link transmitters cannot be synchronized, the coherence interval channel encoder 115 in combination with the orthogonal function encoder 130,135 and the PN modulator 140 produce a modulated signal z that possesses a sufficient level of bit energy to noise density ratio $E_b/N_o$ to facilitate coherent detection by a receiver.

An exemplary receiver 200 according to the present invention that is capable of receiving the modulated spread spectrum signal z is illustrated in FIG. 3. As previously indicated, according to a feature of the present invention, the signal z, received by the receiver 200 will be characterized by a minimum phase shift. In the illustrative embodiment, wherein 20-bit blocks are transmitted at 64 Kbps, the received signal z, should exhibit, at most, a 6° phase shift over the duration of each 20-bit block in a typical high mobility environment, such as one with a Doppler phase shift interval of 0.5 msec. It is noted that similar signals in FIGS. 2 and 3 are labeled with like reference symbols for clarity, for example, signals z, v and u. In FIG. 3, the modulated spread spectrum signal z which is received by an antenna associated with the receiving unit is provided to I- and Q-channel signal multipliers 205 and 210. The signal multipliers 205 and 210 also receive down conversion signals from respective frequency synthesizers 206 and 211.

The signal multipliers 205 and 210 combine the respective received signals to down convert the signal z into in-phase channel and quadrature phase channel baseband encoded signals $j_1$ and $j_2$. The encoded signals $j_1$ and $j_2$ are provided to respective signal multipliers 215 and 220. The signal multipliers 215 and 220 combine the encoded baseband signals $j_1$ and $j_2$ with corresponding I- and Q-channel PN sequences from PN sequence generators 216 and 221 to demodulate the signals into demodulated encoded signals $k_1$ and $k_2$. Accordingly, the signal multipliers 205 and 210 and I- and Q-channel PN sequence generators 216 and 221 operate as a PN QPSK channel demodulator.

The encoded signals $k_1$ and $k_2$ are provided to respective matched filters 225 and 230, respectively. The matched filters 225 and 230 further receive orthogonal function sequences, such as Walsh sequences, and PN sequences from sequence generators 227 and 229, respectively. The matched filters 225 and 230 use these sequences to despread and descramble the encoded signals $k_1$ and $k_2$ into data signals $\bar{s}_1$ and $\bar{s}_2$. If communication privacy is not critical in the communication system and the modulated spread spectrum signal is not scrambled by a PN sequence, then the PN sequence generator 229 may be omitted without affecting the performance of the receiver 200.

Figure 6:
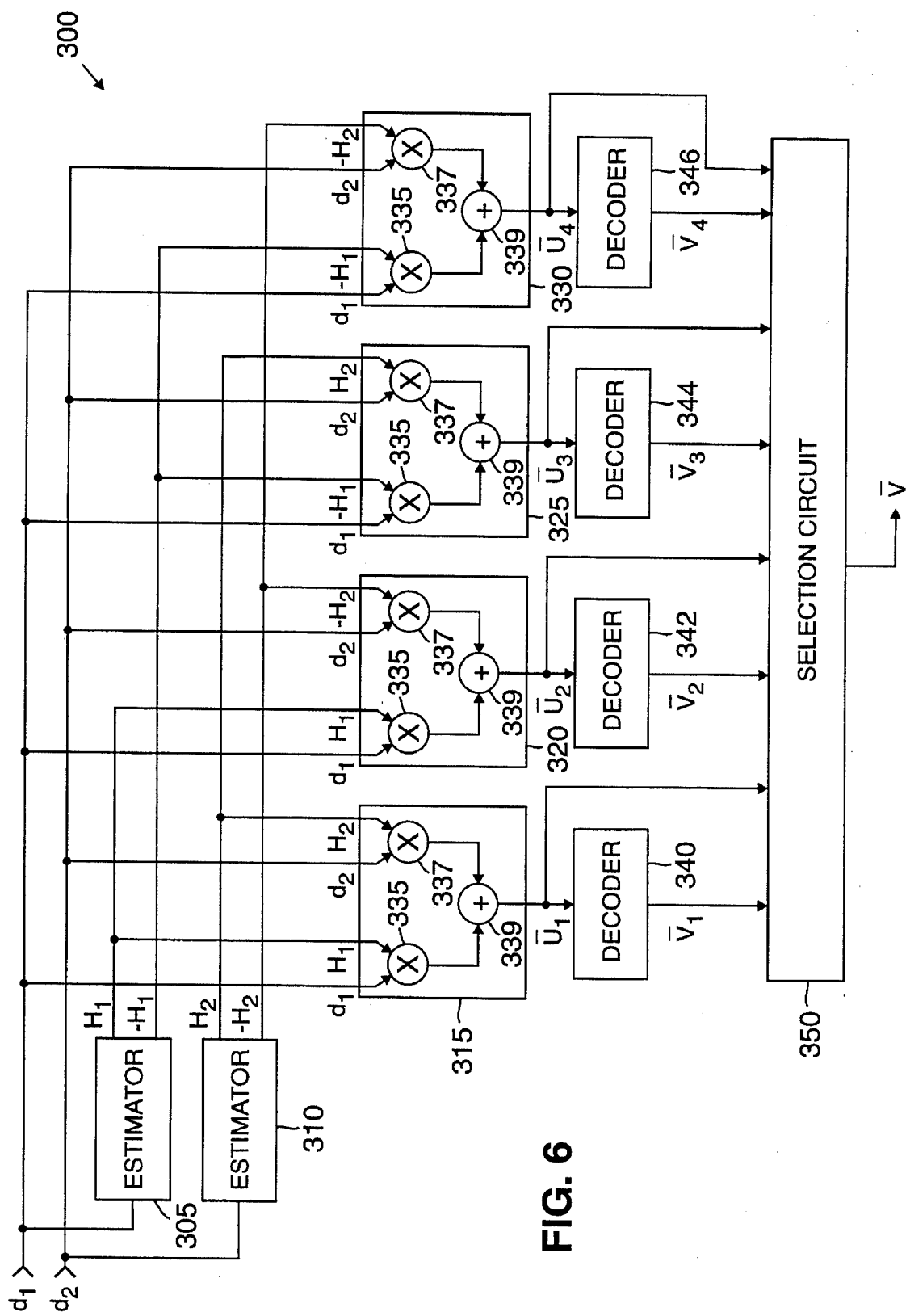
FIG. 6 is a schematic block diagram of an exemplary constructive weighted signal coherent decoder according to the present invention that may be used in the receiver of FIG. 3 for decoding bi-phase shift keying (BPSK) modulated data signals.

The data signals $\bar{s}_1$ and $\bar{s}_2$ are provided to corresponding analog-to-digital (A/D) converters 235 and 240 which convert the signals to digital signals $d_1$ and $d_2$. The components of the receiver 200 that process the received modulated spread spectrum signal z into the digital signals $d_1$ and $d_2$ can be collectively regarded as a PN channel demodulator and despreader which is represented by the broken outline 245. The digital signals $d_1$ and $d_2$ are then provided to a weighted signal coherent decoder 250. Exemplary coherent decoders 250 for processing QPSK and BPSK data signals according to the present invention are shown in FIGS. 4 and 6, respectively, which are described below.

The coherent decoder 250 decodes and coherently combines the digital signals $d_1$ and $d_2$ into a digital signal P that corresponds to the interleaved and encoded signal $\bar{v}$ generated by the interleaver 110 of FIG. 2. The coherent decoder 250 provides the digital signal $\bar{v}$ to a de-interleaver 255 which arranges the data symbols back into their original order to form the data signal v. The data signal v is provided to a diversity decoder 260 that is the complement of the diversity encoder 105 in FIG. 2. The diversity decoder 260 decodes the data signal v back into the original data signal u. If the diversity encoder 105 and/or symbol interleaver 110 are omitted from a corresponding transmitter, then the complement component symbol de-interleaver 255 and/or diversity decoder 260 should be omitted from the receiver 200.

In order for the receiver 200 to receive data transmitted by the transmitter 100 of FIG. 2, the frequency synthesizers 206 and 211 of FIG. 3 must generate signals having frequencies and a phase shift that correspond to the frequency synthesizers 159 and 169 of FIG. 2. Likewise, the PN sequence generators 216, 221 and 229 must generate sequences that correspond to the PN sequence generators 152, 162 and 125, respectively, and the Walsh sequence generator 227 must generate a Walsh sequence corresponding to the sequence generated by the Walsh sequence generator 135. The use of a weighted signal coherent decoder 250 in cell-sites enables the receiver 200 to achieve a 3 dB gain in detecting the received data signal over typical non-coherent cell-site receivers. Further, the weighted signal coherent decoder 250 enables coherent signal detection by a cell-site receiver without the need for a pilot tracking signal.

Figure 4:
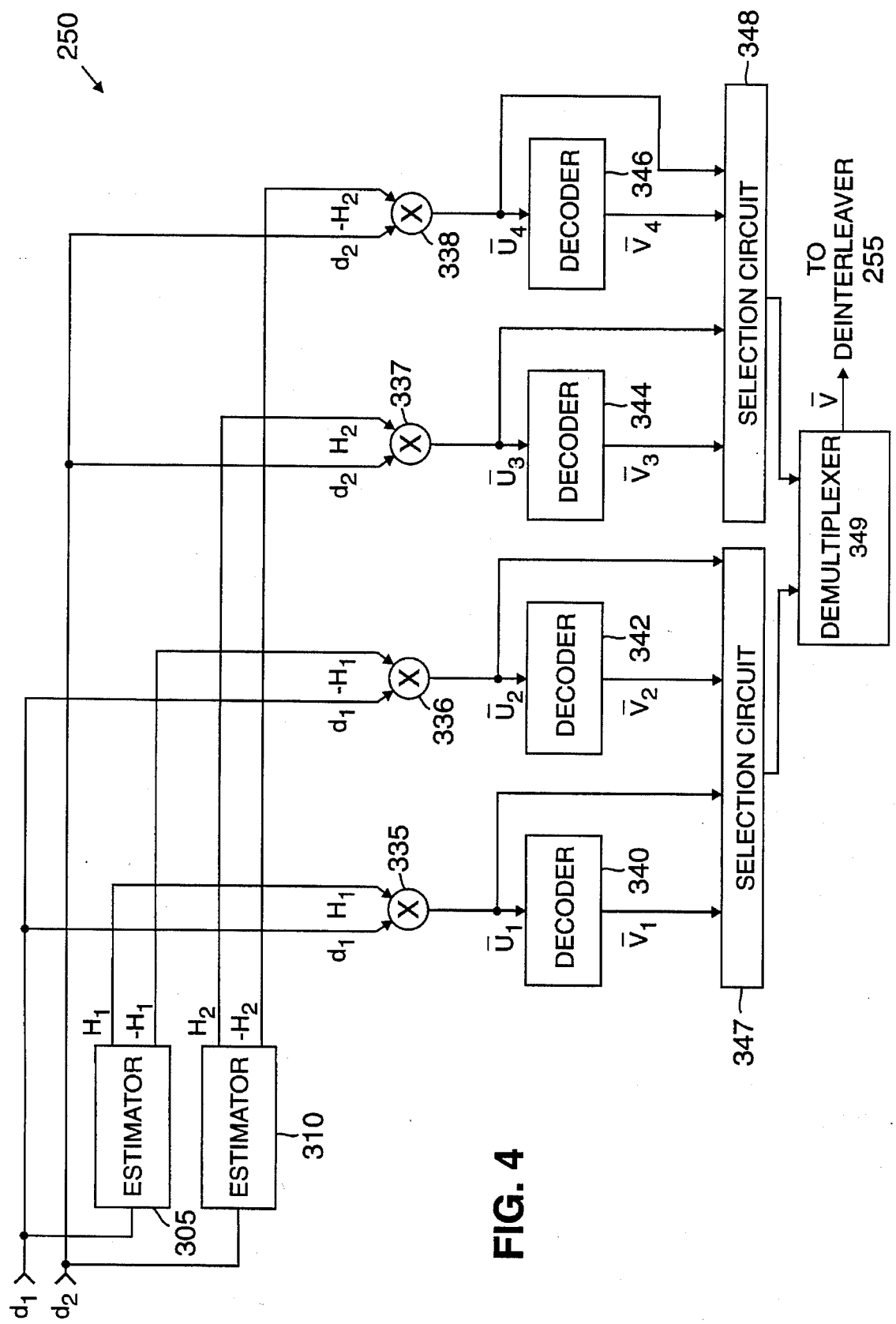
FIG. 4 is a schematic block diagram of an exemplary constructive weighted signal coherent decoder according to the present invention that may be used in the receiver of FIG. 3 for decoding quadrature phase shift keying (QPSK) modulated data signals.

An exemplary weighted signal coherent decoder 250 according to the present invention is illustrated in FIG. 4. The coherent decoder 250 in FIG. 4 can process encoded digital signals $d_1$ and $d_2$ derived from a spread spectrum signal z that is QPSK modulated. Referring to FIG. 4, the encoded digital signals $d_1$ and $d_2$ generated by the A/D converters 235 and 240 of FIG. 3 are provided to corresponding power estimators 305 and 310. The encoded digital signal $d_1$ is also provided to first and second signal multipliers 335 and 336 and the digital signal $d_2$ is also provided to third and fourth signal multipliers 337 and 338.

The power estimators 305 and 310 determine the mean square root of the power of the respective digital signals $d_1$ and $d_2$ and generate corresponding power signals $H_1$ and $H_2$ and their complement signals $-H_1$ and $-H_2$. The complement power signals $-H_1$ and $-H_2$ are 180° out of phase with the corresponding power signals $H_1$ and $H_2$. Although the power estimators 305 and 310 are described as generating power signals representing the mean square root of the digital signal power, any power signal having a magnitude representative of the corresponding digital signal strength may be used in accordance with the present invention.

The power signal $H_1$ is provided to the signal multiplier 335 and the complement power signal $-H_1$ is provided to the signal multiplier 336. In a similar manner, the power signal $H_2$ is provided to the signal multiplier 337 and the complement power signal $-H_2$ is provided to the signal multiplier 338. The signal multipliers 335-338 generate corresponding weighted signals $u_x$ that are the permutations of the expressions $d_1(\pm H_1)$ and $d_2(\pm H_2)$. Such permutations represent weighting of the signals for various phase relationships to enable coherent combining of the signals. The signal multiplier 335 generates a signal $\bar{u}_1=d_1 H_1$, the signal multiplier 336 generates a signal $u_2=d_1(-H_1)$, the signal multiplier 337 generates a signal $u_3=d_2 H_2$, and the signal multiplier 338 generates a signal $u_4=d_2(-H_2)$. Accordingly, the four signal multipliers 335-338 operate as weighted signal generators.

Each of the weighted signals $u_1-u_4$ are provided to respective decoders 340, 342, 344 and 346, and to first and second decoded signal selection circuits 347 and 348. The decoders 340-346 may be of the Viterbi decoder type which is well known in the art. The decoders 340 and 342 generate weighted decoded signals $\bar{v}_1$ and $\bar{v}_2$ that correspond to the even ordered bits of the QPSK modulated signal z which are provided to the selection circuit 347. Likewise, the decoders 344 and 346 generate corresponding weighted decoded signals $\bar{v}_3$ and $\bar{v}_4$ for the odd ordered data bits which are provided to the selection circuit 348.

Each selection circuit 347 and 348, discussed further below in conjunction with FIG. 5, determines and selects which of the decoded weighted signals $\bar{v}_1$ or $\bar{v}_2$, and $\bar{v}_3$ or $\bar{v}_4$ that correspond to the properly decoded even and odd bits of the received signal z. The decoded weighted signals $\bar{v}_1$, $\bar{v}_2$, $\bar{v}_3$ and $\bar{v}_4$ include the various polarity and relative phase relationship of the even and odd decoded weighted signals that can be generated from the received signal z with only two of the decoded signals represent synchronous in-phase reading of the received signal z. The selected even and odd decoded weighted signals are then combined by a demultiplexer 349 to produce a combined decoded coherently detected digital sequence $\bar{v}$ which is provided to the de-interleaver 255 of FIG. 3.

Figure 5:
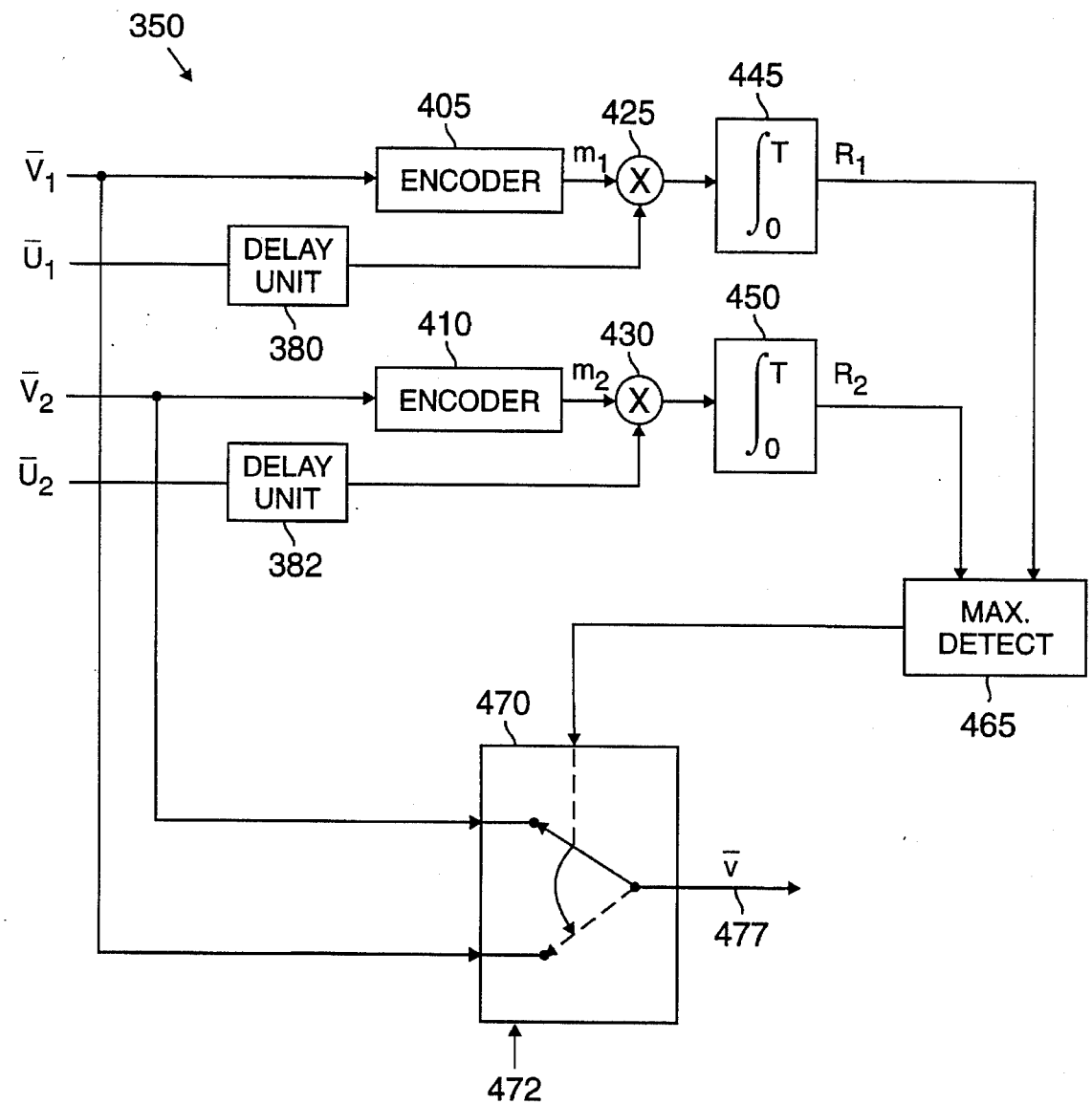
FIG. 5 is a schematic block diagram of an exemplary selection circuit according to the present invention which may be used in the coherent detector of FIG. 4.

An exemplary decoded signal selection circuit 347 is shown in FIG. 5. The selection circuit 348 may be constructed in a substantially identical manner as the selection circuit 347 of FIG. 5. Referring to FIG. 5, the decoded digital signals $\bar{v}_1$ and $\bar{v}_2$ are provided to respective inputs 472 of a switch 470. Also, the signals $\bar{v}_1$ and $\bar{v}_2$ are re-encoded by respective encoders 405 and 410 into signals $m_1$ and $m_2$. The encoders 405 and 410 should perform the same encoding as the coherence interval channel encoder 115 in the corresponding transmitter 100 of FIG. 2. The encoded signals $\bar{u}_1$ and $\bar{u}_2$ generated by the signal multiplexers 335 and 336 of FIG. 4 are provided to delay units 480 and 482 which may be conventional latches.

The re-encoded signals $m_1$ and $m_2$ are then combined with the respective delayed encoded signals $u_1$ and $u_2$ by signal multipliers 425 and 430. The resulting product signals are then integrated by integrators 445 and 450 respectively, to form integrated signals $R_1$ and $R_2$. The delay units 480 and 482 compensate for the processing times of the encoders 405 and 410. Accordingly, the delay units 480 and 482 delay the encoded information to align the bits of the signals $\bar{u}_1$ and $\bar{u}_2$ with the corresponding bits of the re-encoded signals $m_1$ and $m_2$ at the signal multipliers 425 and 430.

The integrated signals $R_1$ and $R_2$ are provided to a maximum signal detector 465 which is connected to a control input of the switch 470. The maximum signal detector 465 determines which of the signals $R_1$ and $R_2$ has the greatest magnitude and controls the switch 470 to connect the respective decoded signal $\bar{v}_1$ and $\bar{v}_2$ to a switch output 477. The signal $R_1$ or $R_2$ with the greatest magnitude corresponds to the properly coherently decoded signal. Accordingly, the proper decoded signal for the even ordered bits is routed to the switch output 477 that connected to the demultiplexer 349 of FIG. 4. In a similar manner, the selection circuit 348 provides the odd ordered bits to the signal combiner 349.

The receiver 200 of FIG. 3 may also be used to detect and decode BPSK modulated signals. A BPSK modulated signal is essentially similar to a QPSK modulated signal except the same bit is modulated on the I- and Q-channels instead of using every other bit on such channels as in the QPSK modulated signal. An exemplary weighted signal coherent decoder 300 according to the present invention that can replace the coherent decoder 250 in FIG. 3 to process encoded digital signals $d_1$ and $d_2$ derived from a spread spectrum signal z that is BPSK modulated is shown in FIG. 6. Similar components of FIGS. 4 and 6 are like numbered for clarity, for example, power estimators 305 and 310 and decoders 340–346.

Referring to FIG. 6, the encoded digital signals $d_1$ and $d_2$ generated by the A/D converters 235 and 240 of FIG. 3 are provided to the corresponding power estimators 305 and 310 and to each one of signal combiners 315, 320, 325 and 330. The power signal $H_1$ is provided to the signal combiners 315 and 320 and the complement power signal $-H_1$ is provided to the signal combiners 325 and 330. In a similar manner, the power signal $H_2$ is provided to the signal combiners 315 and 325 and the complement power signal $-H_2$ is provided to the signal combiners 320 and 330.

Each one of the signal combiners 315–330 may contain first and second signal multipliers 335 and 337 and a signal adder 339. In each signal combiner 315–330, the signal multipliers 335 and 337 and signal 339 are connected so as to generate corresponding weighted signals $u_x$ that correspond to the four permutations of the expression $d_1(\pm H_1)+d_2(\pm H_2)$. The signal combiner 315 generates a signal $u_1=d_1H_1+d_2H_2$, the signal combiner 320 generates a signal $u_2=d_1H_1+d_2(-H_2)$, the signal combiner 325 generates a signal $u_3=d_1(-H_1)+d_2H_2$ and the signal combiner 330 generates a signal $u_4=d_1(-H_1)+d_2(-H_2)$. Accordingly, the four signal combiners 315–330 operate as a weighted signal generator with the generated signals representing all possible signal polarity combinations by multiplying each signal with a corresponding power and complement power signal to facilitate coherent detection. Further, each signal is weighted with the mean square root of its power to assign greater weight to those signals having higher signal to noise ratio.

Figure 7:
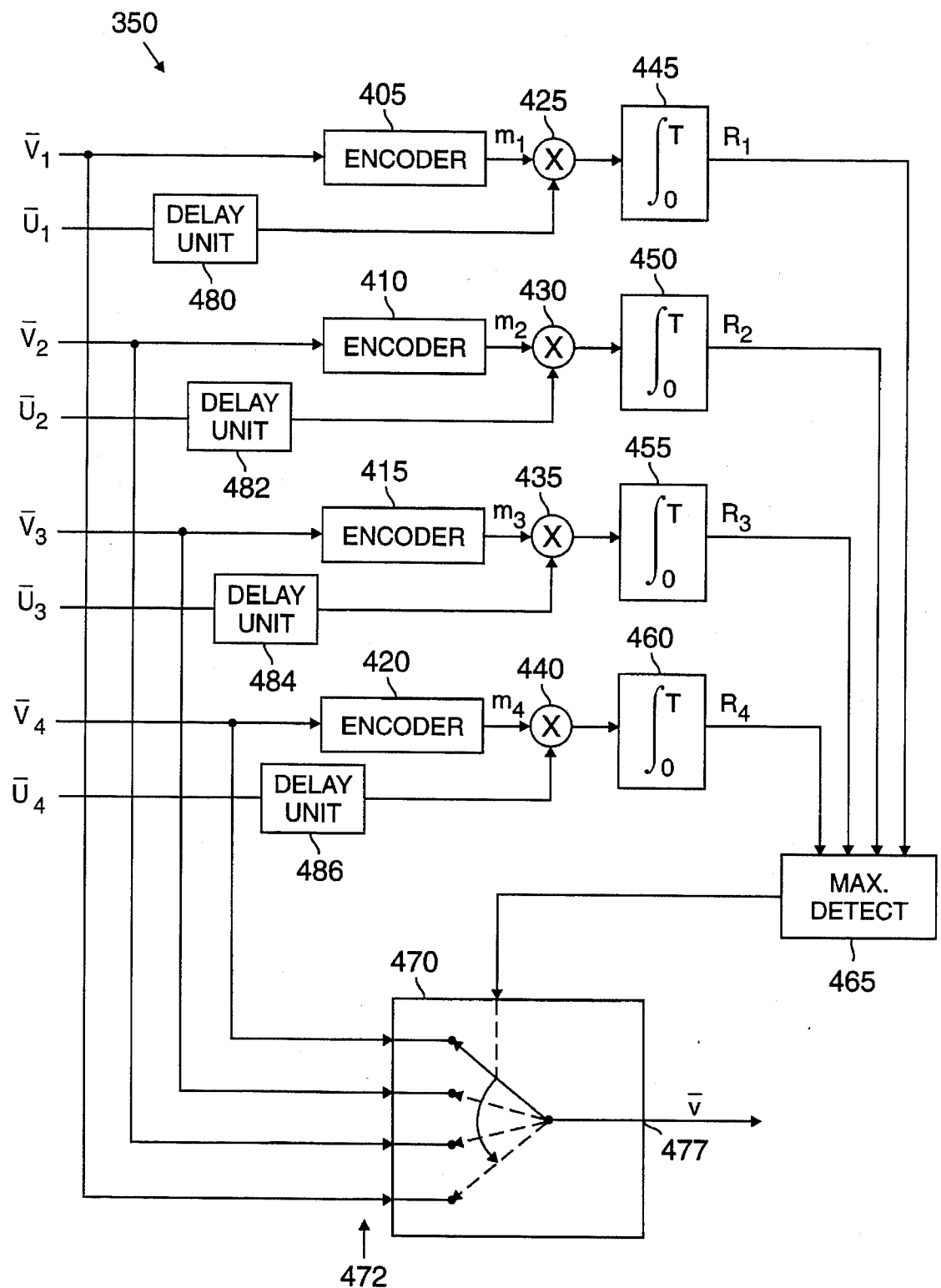
FIG. 7 is a schematic block diagram of an exemplary selection circuit similar to that shown in FIG. 5 which may be used in the coherent decoder of FIG. 6.

Each of the weighted signals $u_1$–$u_4$ are provided to the respective decoders 340, 342, 344 and 346, and to a decoded signal selection circuit 350 having four inputs. An exemplary decoded sequence selection circuit 350 having four inputs is shown in FIG. 7 which is described below. Each decoder 340–346 generates a corresponding one of decoded weighted signals $\bar{v}_1$, $\bar{v}_2$, $\bar{v}_3$ and $\bar{u}_4$ which is provided to the decoded selection circuit 350. The selection circuit 350 determines and selects which of the decoded weighted signals $\bar{v}_1$–$\bar{v}_4$ corresponds to the properly coherently combined decoded sequence in which the polarity and phase relationship represent synchronous in-phase reading of the received signal. The corresponding selected decoded signal is then provided to the de-interleaver 255 of FIG. 3 as represented by the digital signal $\bar{v}$. The data combiner 349 of FIG. 4 is not necessary in the BPSK coherent decoder 300 of FIG. 6 because the odd and even ordered bits have not been separated.

An exemplary four-input decoded signal selection circuit 350 according to the present invention is shown in FIG. 7. The four-input selection circuit 350 of FIG. 7 and the two-input selection circuit 347 of FIG. 5 are substantially identical. The four-input selection circuit 350, however, additionally employs encoders 415 and 420, delay units 484 and 486, signal multipliers 435 and 440 and integrators 455 and 460 for processing the two additional input signal groups. Similar components of FIGS. 5 and 7 are like numbered for clarity, for example, the encoders 405 and 410, the maximum detector 465 and the switch 470.

Referring to FIG. 7, the decoded digital signals $\bar{v}_1$–$\bar{v}_4$ are provided to respective inputs 472 of the switch 470. Also, the decoded digital signals $\bar{v}_1$–$\bar{v}_4$ are re-encoded by the respective encoders 405,410, 415 and 420 into encoded signals $m_1$, $m_2$, $m_3$ and $m_4$. The encoders 405–420 should perform the same encoding as the channel encoder 115 of FIG. 2. The encoded signals $\bar{u}_1$, $\bar{u}_2$, $\bar{u}_3$ as and $\bar{u}_4$ generated by the signal combiners 315–338 of FIG. 6 are provided to delay units 480, 482, 484 and 486.

The re-encoded signals $m_1$–$M_4$ are then combined with the respective delayed encoded signals $u_1$–$u_4$ by the signal multipliers 425,430, 435 and 440. The resulting product signals are then integrated by integrators 445,450, 455 and 460, respectively, to form integrated signals $R_1$, $R_2$, $R_3$ and $R_4$. The delay units 480–486 compensate for the processing times of the encoders 405–420 by aligning the bits of the signals $\bar{u}_1$–$\bar{u}_4$ with the corresponding bits of the re-encoded signals $m_1$–$m_4$ at the signal multiplexers 425–440.

The integrated signals $R_1$–$R_4$ are provided to the maximum signal detector 465 which is connected to the control input of the switch 470. The maximum signal detector 465 determines which of the signals $R_1$–$R_4$ has the greatest magnitude and controls the switch 470 to connect the corresponding decoded signal to a switch output 477. The proper decoded signal $\bar{v}$ is routed to the switch output 477 which is connected to the de-interleaver 255 of FIG. 3. A decoded signal selection circuit to select one of any number of decoded signals representing a synchronous reading may be constructed in a substantially identical manner as the circuits 347 and 300 of FIGS. 5 and 7.

The coherent detection method of the present invention is readily applicable to receivers that use multiple antennas to achieve increased performance based on diversity gain in the communication system. A receiver 500 that is capable of processing a modulated spread spectrum signal z received from two antennas is shown in FIG. 8. Similar components in FIGS. 3 and 8 are like numbered for clarity, for example, the PN channel demodulators 245 and the de-interleaver 255.

In FIG. 8, the modulated spread spectrum signal z is received by two separate antennas as represented by signals z and z'. Each signal z and z' is demodulated by respective channel demodulators and despreaders 245. Each demodulator 245 may contain substantially identical components as shown in the channel demodulator and despreader 245 in FIG. 3. The channel demodulators and despreaders 245 generate corresponding demodulated I- and Q-channel data signals $d_1$ and $d_2$, and $d_1'$ and $d_2'$ which are provided to a multiple signal coherent decoder 510.

The coherent decoder 510 coherently decodes and combines the data sequences to produce the decoded signal $\bar{v}$ which corresponds to the digital signal $\bar{v}$ in FIG. 3. The digital signal $\bar{v}$ is then deinterleaved by the de-interleaver 255 to produce the signal v which is decoded by the diversity decoder 260 to generate the original data signal u in a substantially identical manner as that described above with respect to FIG. 3.

Figure 9:
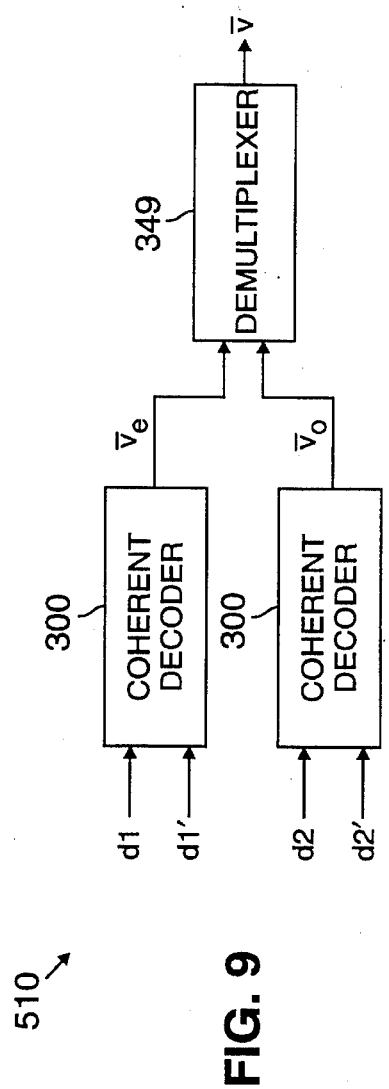
FIG. 9 is a coherent decoder according to the present invention that may suitably be used in the receiver of FIG. 8.

A suitable multiple-signal coherent decoder 510 according to the present invention is shown in FIG. 9. In FIG. 9, the digital sequences $d_1$ and $d_1'$ corresponding to the demodulated I-channel data signals containing the even ordered bits are provided to a first coherent decoder 300, as discussed above in conjunction with FIG. 6, which coherently decodes and combines the signals into an even ordered decoded bit signal $\bar{v}_e$. Likewise, the digital sequences $d_2$ and $d_2'$, representing the Q-channel demodulated signal, are provided to a second coherent decoder 300 which generates the odd ordered bit signal $\bar{v}_o$. The even and odd ordered bit signals $\bar{v}_e$ and $\bar{v}_o$ are then provided to a demultiplexer 349 to generate the digital signal $\bar{v}$.

Although FIGS. 8 and 9 depict a receiver capable of achieving a diversity gain by processing a received signal from two antennas, any number of antennas may be used in accordance with the present invention. In such receivers, a plurality N of channel demodulators are used to process the modulated signals received from a like plurality N of antennas. The corresponding demodulated I- and Q-channel digital signals $d_1, \ldots, d_1^N$ and $d_2, \ldots, d_2^N$ are provided to a single coherent decoder which may be substantially identical to the multiple signal coherent decoder 350 shown in FIG. 9.

In such a coherent decoder, the generated I-channel signals and Q-channel signals will be provided to respective weighted signal coherent decoders similar to the coherent decoder 300, shown in FIG. 6. In such weighted signal coherent decoders, power estimator signals $H_1, \ldots, H_N$ are generated by power estimators, which may be similar to the estimators 305 and 310. Further, in the weighted signal coherent decoders, the number of signal combiners and decoders as well as inputs to the selection circuit equal the number of antennas squared or $N^2$. For example, if three antennas are used, then nine ($3^2$) signal combiners, decoders and inputs to the selection circuit are required to generate all possible phase representations with the signals to achieve a properly coherently decoded signal. The signal combiners should generate signals corresponding to all the permutations of the expression:

$$\sum_{n=1}^{N} d_n(\pm H_n),$$

where N is the number of antennas. Suitable techniques may be employed to reduce the number of components required to generate the signals corresponding to the permutations of the above expression without departing from the teaching of the present invention.

The generated combined signals should be decoded by respective coherent decoders in a manner such as that shown in FIG. 6 with the particular decoded signal that corresponds to a synchronous reading of the received signal being selected based on the maximum magnitude signal technique illustrated in FIGS. 5 and 7.

Receivers of the present invention achieve an advantage over typically existing CDMA receivers in that they perform coherent signal detection whether employed in the forward or reverse link to realize an increase in the signal to noise density ratio. Further, such receivers perform coherent detection without the need of a pilot tracking signal.

Although several embodiments of a CDMA transmitter and receiver according to the present invention have been described in detail above, it would be readily understood by those having ordinary skill in the art that many modifications to the described embodiment are possible without departing from the teaching of the present invention. All such modifications are intended to be encompassed by the claimed invention. For instance, the diversity encoder and decoder, if included in the communication system, may be a convolutional encoder and decoder of sufficient block lengths to provide adequate redundancy to minimize bit errors caused by noise interference in the communications link. Further, the communication system is not intended to be limited to cellular telecommunications and may be used in any multi-signal communications environment requiring high data transmission rates with reduced bit errors.

I claim:

1. Apparatus for transmitting data signals in a CDMA spread spectrum transmission system comprising:

a coherence interval channel encoder having an input and an output, the input being operable to receive an input data signal, wherein the coherence channel encoder is capable of processing an input data signal into encoded data blocks;

an orthogonal function encoder having an input and an output, the input being connected to the channel encoder output, wherein the orthogonal function encoder combines a data signal received at its input with a particular orthogonal function sequence to form a spread data signal which is provided to the output; and a pseudo-noise (PN) channel modulator having an input and an output, the input being connected to the orthogonal function encoder output, wherein the PN channel modulator combines the spread signal with at least one PN sequence and modulates the resulting data signal, and wherein the generated encoded data blocks are of sufficiently short length to minimize phase shift of the transmitted modulated data signal at a receiver to enable the receiver to perform coherent detection of the data signal.

2. The apparatus of claim 1 wherein the coherence interval channel encoder is a convolutional encoder.

3. The apparatus of claim 1 further comprising a PN encoder connected between the channel encoder output and the orthogonal function encoder wherein the PN encoder combines the encoded data signal from the channel encoder with a particular PN sequence and provides the combined signal to the orthogonal function encoder.

4. The apparatus of claim 1 wherein the orthogonal function encoder is a Walsh encoder.

5. The apparatus of claim 1 wherein the PN channel modulator is a PN QPSK modulator.

6. The apparatus of claim 1 further comprising a diversity encoder having an input and an output, the input receiving the input data signal and the output being connected to the channel encoder input.

7. The apparatus of claim 6 further comprising a symbol interleaver having an input and an output, the symbol interleaver output being connected to the channel encoder input, and the symbol interleaver input being connected to the second channel encoder output.

8. The apparatus of claim 6 wherein the diversity encoder is a Reed Solomon encoder.

9. The apparatus of claim 1 wherein the coherence interval channel encoder processes the input data signal into encoded data blocks that are transmitted over a time interval that is less than ten percent of the smallest expected Doppler phase shift interval at the receiver.

10. The apparatus of claim 1, wherein the coherence interval channel encoder processes the data signal into encoded data blocks that are transmitted over a time interval that corresponds to less than 10° of a smallest expected Doppler phase shift.

11. The apparatus of claim 1 wherein the apparatus is capable of transmitting data signals in a synchronous manner with at least one other similar transmission system.

12. Apparatus for receiving data signals in a CDMA spread spectrum communication system comprising:

a channel demodulator having an input and in-phase and quadrature phase signal outputs, the input receiving an encoded modulated data signal;

first and second matched filters connected to the demodulator in-phase and quadrature signal outputs, respectively;

a PN sequence generator connected to the first and second matched filters;

an orthogonal function sequence generator connected to the first and second matched filters, wherein each of the matched filters combine the orthogonal function sequence and the PN sequence with demodulated in-phase and quadrature phase data signals from the demodulator;

first and second analog-to-digital (A/D) converters connected to the respective first and second match filters; and a weighted signal coherent decoder connected to the analog-to digital converters and having a decoded signal output.

13. The apparatus of claim 12 further comprising a diversity decoder having an input and an output, the input being connected to the coherent decoder output, wherein the diversity decoder decodes data symbols provided by the coherent decoder to generate an output data signal.

14. The apparatus of claim 13 further comprising a symbol deinterleaver connected between the coherent decoder output and the diversity decoder input.

15. The apparatus of claim 13 wherein the diversity decoder is a Reed Solomon decoder.

16. The apparatus of claim 12, wherein the coherent decoder comprises:

first and second power estimators connected to the respective first and second A/D converter outputs, the power estimators generating power signals $H_1$ and $H_2$ based on signal strength of digital signals $d_1$ and $d_2$ received from the A/D converters;

a weighted signal generator connected to the first and second A/D converters outputs and receiving the power signals $H_1$ and $H_2$, the weighted signal generator generating weighted signal combinations of $d_1(\pm H_1)$ and $d_2(\pm H_2)$ are generated at respective generator outputs;

four channel decoders, each channel decoder having an output and an input connected to a corresponding constructive weighted signal generator output; and a decoded signal selection circuit connected to the weighted signal generator outputs and the channel decoder outputs, the selection circuit determining which of the weighted decoded signals represents an in-phase reading of the data signal and providing the selected decoded signal to the selection circuit decoded signal output.

17. The apparatus of claim 16 wherein the coherent decoder coherently decodes and combines a QPSK modulated data signal and wherein the decoded selection circuit are two circuits that provide respective in-phase and quadrature phase signals to the circuit outputs, the coherent decoder further comprises a demultiplexer connected to the selection circuit to recombine the decoded in-phase and quadrature phase data signals.

18. The apparatus of claim 16 wherein the coherent decoder coherently decodes and combines a BPSK modulated data signal and wherein the weighted signal generator comprises four signal combiners, each signal combiner having first and second signal multipliers connected to a signal adder, each signal adder generating a corresponding permutation of the expression: $d_1(\pm H_1)+d_2(\pm H_2)$.

19. The apparatus of claim 16, wherein the four channel decoders are Viterbi decoders.

20. The apparatus of claim 16, wherein the decoded sequence selection circuit comprises:

a plurality of channel encoders, each encoder having an output and an input connected a respective one of the decoders;

a plurality of signal multipliers, each signal multiplier having an output and a first input connected to a respective encoder output and a second input receiving a corresponding one of the weighted signals;

a plurality signal integrators connected to the signal multipliers, respectively;

a maximum signal detector having a plurality of signal inputs connected to the respective signal integrators and an maximum signal identifier output; and a controllable switch having a plurality of signal inputs connected to the decoder outputs, respectively, and a signal output and a control input connected to the detector maximum signal identifier output, wherein the detector identifies a signal with a maximum magnitude generated by the signal integrators and provides the corresponding weighted signal to the switch output as the decoded output data signal.

21. Apparatus for receiving data signals using a plurality of antennas in a CDMA spread spectrum transmission system comprising:

a plurality of channel demodulators, each demodulator having an input and in-phase and quadrature phase signal outputs, the input receiving an encoded modulated data signal from a respective antenna;

a plurality of sets of first and second matched filters, each first and second matched filter in a set being connected to a respective demodulator in-phase and quadrature signal output, wherein each of the matched filters in a set combine an orthogonal function sequence and a PN sequence with demodulated but encoded in-phase and quadrature phase data signals from the respective demodulator;

a plurality of first and second analog-to-digital (A/D) converters, each A/D converter being connected to a respective matched filters; and a weighted signal coherent decoder connected to the analog-to digital converters and having a decoded signal output, wherein the coherent decoder is capable of generating weighted signals based on respective digital sequences generated by the A/D converters for the in-phase and quadrature phase signals from the demodulators.

22. The apparatus of claim 21 further comprising a diversity decoder having an input and an output, the input being connected to the coherent decoder output, wherein the diversity decoder decodes data symbols provided by the coherent decoder to generate an output data signal.

23. The apparatus of claim 22 further comprising a symbol deinterleaver connected between the coherent decoder output and the diversity decoder input.

24. The apparatus of claim 22 wherein the diversity decoder is a Reed-Solomon decoder.

25. The apparatus of claim 21, wherein the coherent decoder comprises:

a plurality of power estimators connected to the respective first and second A/D converter outputs, each power estimator generating power signals based on signal strength of the data signal received from the respective A/D converters;

a weighted signal generator connected to the A/D converters outputs and to the power estimators, the weighted signal generator having a plurality of outputs, wherein the possible weighted signal combinations of the data signals and their power signals and corresponding complement power signals are generated at the respective circuit outputs;

a plurality of channel decoders, each channel decoder having an output and an input connected to a corresponding constructive weighted signal generator output; and a decoded sequence selection circuit connected to the weighted signal generator outputs and the channel decoder outputs, the selection circuit determining which of the signal combinations represents an in-phase reading of the data signal and providing that signal to a selection circuit output.

26. The apparatus of claim 25, wherein the channel decoders are Viterbi decoders.

27. The apparatus of claim 25, wherein the constructive weighted signal generator comprises a plurality of signal combiner sets, each signal combiner sets having first and second signal multipliers connected to a signal adder.

28. The apparatus of claim 25, wherein the decoded sequence selection circuit comprises:

a plurality of channel encoders, each encoder having an output and an input connected a respective one of the channel decoders;

a plurality of signal multipliers, each signal multiplier having an output and a first input connected to a respective encoder output and a second input receiving a corresponding one of the weighted signals;

a plurality of signal integrators connected to the plurality of signal multipliers, respectively;

a maximum signal detector having a plurality of signal inputs connected to the respective signal integrators and an maximum signal identifier output; and a controllable switch having a signal output, a control input connected to the detector maximum signal identifier output, and a plurality of signal inputs connected to the channel decoder outputs, respectively, wherein the detector identifies the maximum signal generated by the signal integrators and provides the corresponding weighted sum signal to the switch output as the decoded output data signal.

29. The apparatus of claim 21 wherein the number of antennas to receive the data signals is two.

30. The apparatus of claim 21 wherein the channel demodulator is a QPSK demodulator.

31. A method for transmitting CDMA spread spectrum signals in a transmission system comprising:

channel encoding a data signal to be transmitted into encoded data blocks;

combining the encoded data blocks with an orthogonal function sequence to form a spread signal;

modulating the spread signal and combing the spread signal with at least one respective PN sequence; and transmitting the modulated data signals at a particular data rate, wherein the step of channel encoding produces sufficiently short encoded data blocks to minimize phase shift of the modulated signal at a receiver to enable the receiver to perform coherent detection of the modulated data signal.

32. The method of claim 31 wherein the step of channel encoding is convolutional encoding.

33. The method of claim 31 further comprising the step of scrambling the encoded data blocks by combining the sequences with a PN sequence.

34. The method of claim 31 wherein the step of combining the encoded data blocks with an orthogonal function sequence combines the encoded data blocks with a Walsh function sequence.

35. The method of claim 31 wherein the step of modulating the spread signal includes QPSK modulating the spread signal.

36. The method of claim 31 further comprising the step of diversity encoding the data signal before channel encoding.

37. The method of claim 31 wherein the step of diversity encoding includes Reed Solomon encoding.

38. The method of claim 31 further comprising the step of interleaving data symbols of the data signal before channel encoding.

39. A method for receiving CDMA spread spectrum signals in a communication system comprising:

channel demodulating a received modulated and encoded data signal into in-phase and quadrature phase demodulated signals;

combining each of the in-phase and quadrature phase demodulated signals with respective PN sequences and orthogonal function sequences to produce processed in-phase and quadrature phase signals;

converting the processed in-phase and quadrature phase signals into a digital signal;

generating weighted decoded in-phase and quadrature phase signals based on the digital processed in-phase and quadrature phase signals; and selecting the weighted signals that correspond to synchronous reading of the modulated signal.

40. The method of claim 39 further comprising diversity decoding the selected weighted signals.

41. The method of claim 39 further comprising symbol deinterleaving the selected weighted signals.

42. The method of claim 39 wherein the step of generating the weighted signals further comprises:

generating power estimate signals and complement power estimate signals based on the digital processed in-phase and quadrature phase signals;

generating respective weighted signals by combining each digital processed signal with a corresponding power estimate signal and complement estimate signal; and decoding the generated weighted signals.

43. The method of claim 39 wherein the step of selecting the weighted decoded signals that correspond to synchronous reading of the modulated signal further comprises:

channel encoding each of the weighted decoded signals to generate respective encoded signals;

multiplying each encoded signal with the corresponding weighted decoded signal to produce multiplied signals;

integrating the multiplied signals to produce integrated signals; and selecting the weighted decoded signals that correspond to the maximum integrated signal.

44. A method for receiving CDMA spread spectrum signals in a communication system using a plurality of antennas comprising:

channel demodulating each modulated and encoded spread spectrum signal received from each respective antenna into corresponding in-phase and quadrature phase demodulated signals;

combining each of the in-phase and quadrature phase demodulated signals with respective PN sequences and orthogonal function sequences to produce respective processed in-phase and quadrature phase signals;

converting the respective processed in-phase and quadrature phase signals into corresponding digital signals;

generating weighted decoded in-phase and quadrature phase signals based on the digital processed in-phase and quadrature phase signals; and selecting the weighted signals that correspond to synchronous reading of the modulated signal.

45. The method of claim 44 further comprising diversity decoding the selected weighted signals.

46. The method of claim 44 further comprising symbol deinterleaving the selected weighted signals.

47. The method of claim 44 wherein the step of generating the weighted signals further comprises:

generating respective power estimate signals and complement power estimate signals based on signal strength of the processed in-phase and quadrature phase digital signals;

generating respective weighted signals by combining each digital processed signal with a corresponding power estimate signal and complement estimate signal and summing the combined signals; and decoding the generated weighted signals.

48. The method of claim 44 wherein the step of selecting the weighted decoded signals that correspond to synchronous reading of the modulated signal further comprises:

channel encoding each of the weighted decoded signals to generate respective encoded signals;

multiplying each encoded signal with the corresponding weighted decoded signal to produce multiplied signals;

integrating the multiplied signals to produce integrated signals; and selecting the weighted decoded signals that correspond to the maximum integrated signal.

* * * * *